(12) United States Patent
Huberman et al.

(10) Patent No.: US 11,012,890 B2
(45) Date of Patent: May 18, 2021

(54) OPTIMAL BURST TRANSMISSION TIMES THROUGH SINGLE MODEMS

(71) Applicant: CABLE TELEVISION LABORATORIES, INC., Louisville, CO (US)

(72) Inventors: Bernardo Huberman, Palo Alto, CA (US); Scott H. Clearwater, Menlo Park, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 31 days.

(21) Appl. No.: 16/659,771

(22) Filed: Oct. 22, 2019

(65) Prior Publication Data

US 2020/0128444 A1    Apr. 23, 2020

Related U.S. Application Data

(60) Provisional application No. 62/748,836, filed on Oct. 22, 2018.

(51) Int. Cl.
| | |
|---|---|
| *H04W 28/12* | (2009.01) |
| *H04W 28/06* | (2009.01) |
| *H04L 12/28* | (2006.01) |
| *H04W 24/08* | (2009.01) |
| *H04W 24/10* | (2009.01) |
| *H04L 12/825* | (2013.01) |

(52) U.S. Cl.
CPC ......... *H04W 28/12* (2013.01); *H04L 12/2801* (2013.01); *H04W 24/08* (2013.01); *H04W 24/10* (2013.01); *H04W 28/06* (2013.01)

(58) Field of Classification Search
CPC ..... H04W 28/12; H04W 28/06; H04W 24/08; H04W 24/10; H04L 12/2801; H04L 47/25
See application file for complete search history.

(56) References Cited

U.S. PATENT DOCUMENTS

| | | | |
|---|---|---|---|
| 2002/0080726 A1* | 6/2002 | Klassen | H04L 43/0888 370/252 |
| 2014/0105045 A1* | 4/2014 | Oh | H04L 1/0026 370/252 |
| 2018/0287902 A1* | 10/2018 | Chitalia | G06F 11/3452 |
| 2018/0367324 A1* | 12/2018 | Bekiares | H04B 7/18513 |

* cited by examiner

*Primary Examiner* — Harry H Kim
(74) *Attorney, Agent, or Firm* — Elevated IP, LLC

(57) ABSTRACT

The present disclosure generally relates to systems, methods and software for determining an optimal burst transmission time through a modem, such as a cable modem, a wireless access point, a node in a cable network, or a satellite communication link. Particularly, the present disclosure makes it possible for a burst of queued data, defined as data above a certain percentile of a monitored traffic rate, to be transmitted by the modem at a time that provides the best chance of avoiding a collision with a co-occurring burst of data from another user connected to the same modem. In an embodiment, the systems, methods and software disclosed herein use the optimal transmission time to replace a contention window transmission time, at least for bursty data, or they completely eliminate the need for contention windows, at least for bursty data.

20 Claims, 6 Drawing Sheets

OPTIMAL BURST TRANSMISSION TIMES THROUGH SINGLE MODEMS

CROSS-REFERENCE TO RELATED APPLICATIONS

This application claims the benefit of and priority to U.S. Provisional Patent Application No. 62/748,836, filed Oct. 22, 2018, which is hereby incorporated by reference in its entirety.

STATEMENT REGARDING FEDERALLY SPONSORED RESEARCH

None.

BACKGROUND

Digital content has become increasingly bandwidth intensive and subject to intermittent, high-volume spikes. For example, when an Internet user switches between written content and video content, online gaming, or another streaming activity, data consumption rises. Such spikes place a high burden on data hubs, nodes and modems, where high-volume demands from multiple users at random intervals merge and can lead to data collisions and failed transmissions.

SUMMARY

The present disclosure generally relates to systems, methods and software for determining an optimal burst transmission time through a modem, such as a cable modem, a wireless access point, a node in a cable network, or a satellite communication link. Particularly, the present disclosure makes it possible for a burst of queued data, defined as data above a certain percentile of a monitored traffic rate, to be transmitted by the modem at a time that provides the best chance of avoiding a collision with a co-occurring burst of data from another user connected to the same modem. In an embodiment, the systems, methods and software disclosed herein use the optimal transmission time to replace a contention window transmission time, at least for bursty data, or they completely eliminate the need for contention windows, at least for bursty data.

In an aspect, a method for determining an optimal burst transmission time through a modem comprises: monitoring a traffic rate through a modem over a period; identifying a burst in the traffic rate when the traffic rate exceeds a threshold; measuring inter-burst gaps, where the gaps are defined by a minimum time passage and a maximum time passage; determining a mean and a standard deviation of a lognormal distribution of the inter-burst gaps; using the mean and the standard deviation of the lognormal distribution in a moment-generating function to identify an average time passage value when the risk of a co-occurring burst is minimized; and inserting the average time passage value as a mean in the moment-generating function to back-calculate an optimal transmission time for a queued burst of traffic.

In an embodiment, a method for determining an optimal burst transmission time through a modem further comprises instructing the modem to transmit the queued burst of traffic at the optimal transmission time.

In an embodiment, a method for determining an optimal burst transmission time through a modem further comprises periodically updating the optimal transmission time by repeating the steps of monitoring, identifying, measuring, determining, using, inserting and instructing.

In an embodiment, a method for determining an optimal burst transmission time through a modem further comprises scaling the traffic rate.

In an embodiment, the threshold is set at the $80^{th}$, $85^{th}$, $90^{th}$, $92^{nd}$, $95^{th}$, $97^{th}$, $98^{th}$, or $99^{th}$ percentile.

The minimum time passage for an inter-burst gap may be set at a small value to better distinguish between neighboring bursts that occur close in time, for example, to detect more bursts and increase burst frequency statistics, while a maximum time passage for an inter-burst gap may be set at a value that would accommodate the largest anticipated burst. In an embodiment, the minimum time passage for an inter-burst gap is 11 seconds and the maximum time passage for an inter-burst gap is 200 seconds.

In an embodiment, the optimal transmission time replaces a contention window transmission time, at least for bursty data, or completely eliminates the need for a contention window.

In an embodiment, the optimal transmission time is periodically updated at least one per year, quarter, month, week, day or hour.

In an embodiment, the optimal transmission time is based on a continuous timer that is independent of any trigger or start/stop phenomenon. For example, a continuous timer may be based on Greenwich Mean Time. In an embodiment, the optimal transmission time is a count within a contention window.

In an embodiment, the modem is a single modem, a wireless access point, a node in a cable network, or a satellite communication link. Further, the modem may operably communicate with a single user or multiple users.

In an embodiment, a queued burst of traffic is uplink traffic, downlink traffic, or both uplink traffic and downlink traffic.

In an aspect, a non-transitory computer-readable medium has a plurality of non-transitory instructions executable with a processor for determining an optimal transmission time through a modem, the plurality of non-transitory instructions being executable for: monitoring a traffic rate through a modem over a period; identifying a burst in the traffic rate when the traffic rate exceeds a threshold; measuring inter-burst gaps, where the gaps are defined by a minimum time passage and a maximum time passage; determining a mean and a standard deviation of a lognormal distribution of the inter-burst gaps; using the mean and the standard deviation of the lognormal distribution in a moment-generating function to identify an average time passage value when the risk of a co-occurring burst is minimized; and inserting the average time passage value as a mean in the moment-generating function to back-calculate an optimal transmission time for a queued burst of traffic.

In an embodiment, the plurality of non-transitory instructions are further executable for instructing the modem to transmit the queued burst of traffic at the optimal transmission time.

In an embodiment, the plurality of non-transitory instructions are further executable for periodically updating the optimal transmission time by repeating the steps of monitoring, identifying, measuring, determining, using, inserting and instructing.

In an aspect, a system for determining an optimal transmission time through a modem comprises a cable modem termination system (CMTS) operably communicating with a modem and a processor configured to monitor traffic rate through a modem over a period, to identify a burst in the traffic rate when the traffic rate exceeds a threshold, to measure inter-burst gaps, where the gaps are defined by a minimum time passage and a maximum time passage, to determine a mean and a standard deviation of a lognormal distribution of the inter-burst gaps, to use the mean and the standard deviation of the lognormal distribution in a moment-generating function to identify an average time passage value when the risk of a co-occurring burst is minimized, and to insert the average time passage value as a mean in the moment-generating function to back-calculate an optimal transmission time for a queued burst of traffic.

In an embodiment, the processor is further configured to instruct the modem to transmit the queued burst of traffic at the optimal transmission time.

In an embodiment, the processor is disposed within the cable modem termination system or externally to the cable modem termination system.

In an embodiment, the processor is further configured to periodically update the optimal transmission time by repeating the steps of monitoring, identifying, measuring, determining, using, inserting and instructing.

BRIEF DESCRIPTION OF THE DRAWINGS

Illustrative embodiments of the present invention are described in detail below with reference to the attached drawings.

DETAILED DESCRIPTION

Figure 1:
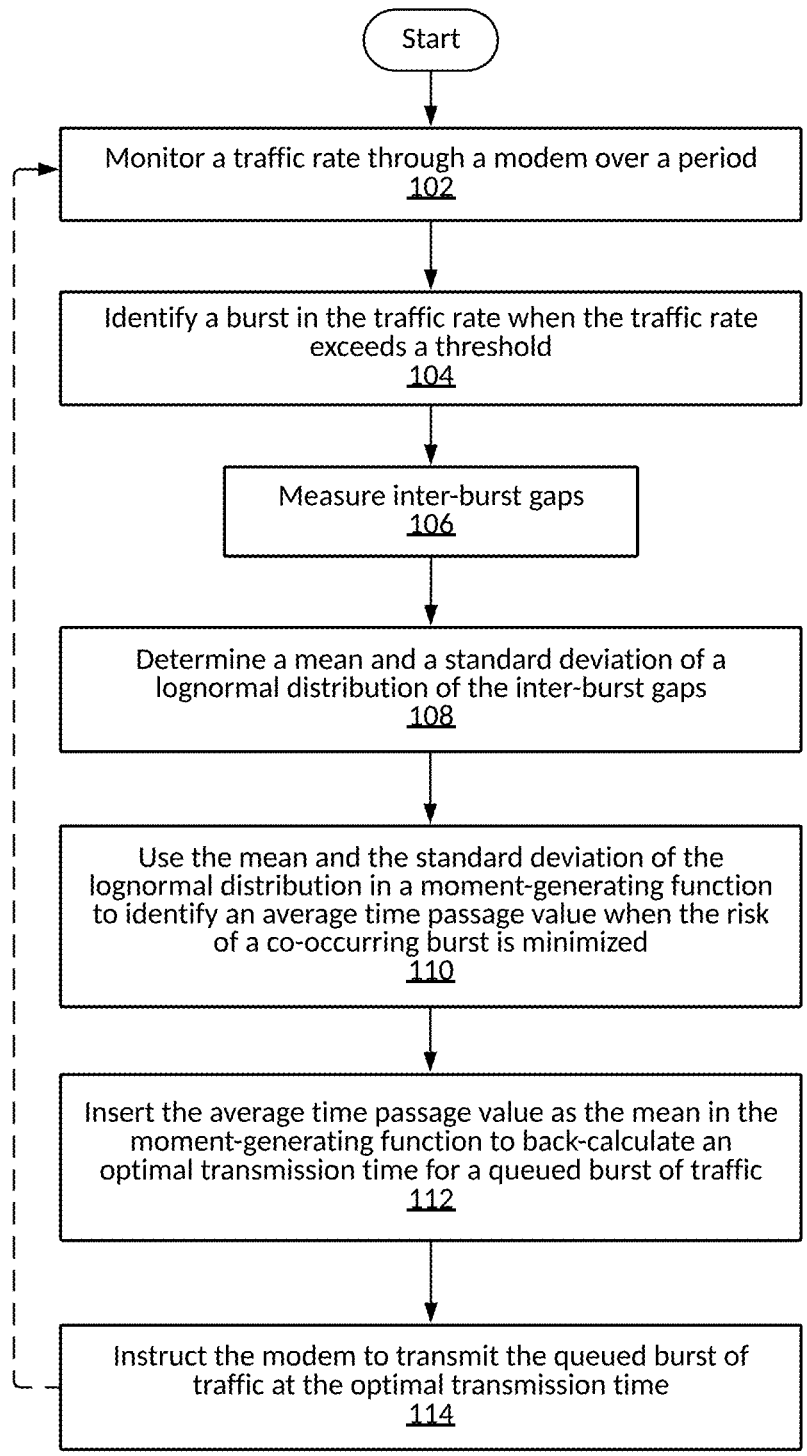
FIG. 1 is a flowchart illustrating steps in a method for determining an optimal burst transmission time through a modem, according to an embodiment.

In general, the terms and phrases used herein have their art-recognized meaning, which can be found by reference to standard texts, journal references and contexts known to those skilled in the art. The following definitions are provided to clarify their specific use in the context of this description.

As used herein, a "burst" of data is any data transmission above a specified percentile of the measured traffic rate for a given data set. "Bursty" data refers to a data set exhibiting a plurality of bursts.

As used herein, the term "network" refers generally to any type of telecommunications or data network including, without limitation, hybrid fiber coaxial (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the term "channel" or "communication channel" refers to a physical transmission medium, such as a wire or optical cable, or a designated non-tangible broadcast medium, such as a wavelength used to convey an information signal from a sender(s) to a receiver(s). A channel has a certain capacity for transmitting information, often measured by its bandwidth in Hz or its data rate in bits per second.

As used herein, "contention" is a media access method used to share a broadcast medium. For example, in a network, two or more nodes may wish to transmit a message across the same wire at the same time, which would result in a collision. To reduce collisions, current contention methods require a user to listen to the network to ensure the channel is free, then wait an amount of time (designated a "contention window") before starting to transmit.

The hub is any system (e.g., a cable modem termination system (CMTS)), device, software, or combination thereof, typically located in a cable company's hub site, or "head-end", which is used to provide high speed data services (i.e., downstream and upstream transmissions), such as cable Internet and Voice over Internet Protocol. The channels are generally network bridges and modems that provide bi-directional data communication via radio frequency channels on a Hybrid Fiber-Coaxial (HFC) or Radio Frequency over Glass (RFoG). The channels are used to deliver broadband Internet access in the form of cable Internet, taking advantage of the high bandwidth of a HFC and RFoG network.

The hub is operable to configure the channels to communicate via a specific protocol (e.g., Data Over Cable Service Interface Specification, or "DOCSIS") specification. In this regard, the hub is operable to send control signals that direct the channels to operate in a particular manner with respect to the employed protocol. In an embodiment, the hub is operable to implement an optimal transmission time for a burst of data through a modem, e.g., by embedding the optimal transmission time in a Physical Link Channel (PLC).

FIG. 1 is a flowchart illustrating steps in a method for determining an optimal burst transmission time through a modem, according to an embodiment. In step 102, a traffic rate through a modem is monitored over a period. In step 104, a burst in the traffic rate is identified when the traffic rate exceeds a threshold. In step 106, inter-burst gaps are measured. The gaps are defined by a minimum time passage between neighboring bursts and a maximum time passage between neighboring bursts. For example, if two bursts occur in rapid succession (i.e., less than the minimum time passage between neighboring bursts), the inter-burst counter restarts after the second burst. In step 108, a mean and a standard deviation of a lognormal distribution of the inter-burst gaps is determined. Then, in step 110, the mean and the standard deviation of the lognormal distribution are used in a moment-generating function to identify an average time passage value when the risk of a co-occurring burst is minimized. In step 112, the average time passage value is inserted as the mean in the moment-generating function to back-calculate an optimal transmission time for a queued burst of traffic. In step 114, the modem is instructed to transmit the queued burst of traffic at the optimal transmission time. As shown by the dashed arrow in FIG. 1, the optimal transmission time is optionally periodically updated by repeating the steps of monitoring, identifying, measuring, determining, using, inserting and instructing.

The embodiments herein may be implemented in a variety of ways as a matter of design choice. For example, the invention can take the form of an entirely hardware embodiment, an entirely software embodiment or an embodiment containing both hardware and software elements.

Figure 2A:
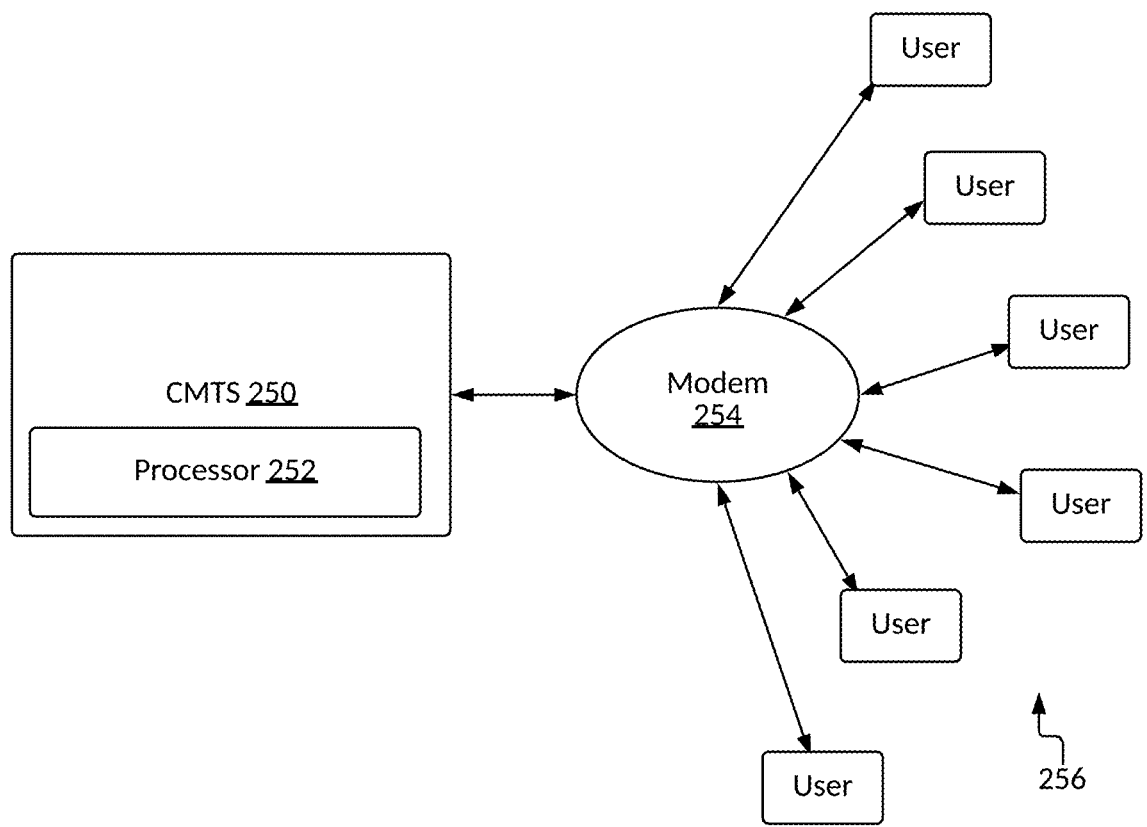
FIG. 2A is a block diagram of an exemplary system for performing methods described herein.

FIG. 2A is a block diagram of an exemplary system for performing methods described herein. For example, the system may include a cable modem termination system (CMTS) 250 configured to transmit/receive data to/from a modem 254 operably communicating with one or more user devices 256. The CMTS may, for example, communicate with modem 254 via a cable access network that includes a combination of optical fiber and/or coaxial cables, amplifiers, and electrical/optical converters. A processor 252 is depicted as being disposed within the CMTS, but it should be recognized that processor 252 may be implemented as a separate device from CMTS 250. Processor 252 is configured to monitor traffic rate through a modem over a period, to identify a burst in the traffic rate when the traffic rate exceeds a threshold, to measure inter-burst gaps, where the gaps are defined by a minimum time passage and a maximum time passage, to determine a mean and a standard deviation of a lognormal distribution of the inter-burst gaps, to use the mean and the standard deviation of the lognormal distribution in a moment-generating function to identify an average time passage value when the risk of a co-occurring burst is minimized, and to insert the average time passage value as a mean in the moment-generating function to back-calculate an optimal transmission time for a queued burst of traffic. CMTS 250 then instructs modem 254 to transmit the queued burst of traffic at the optimal transmission time.

Figure 2B:
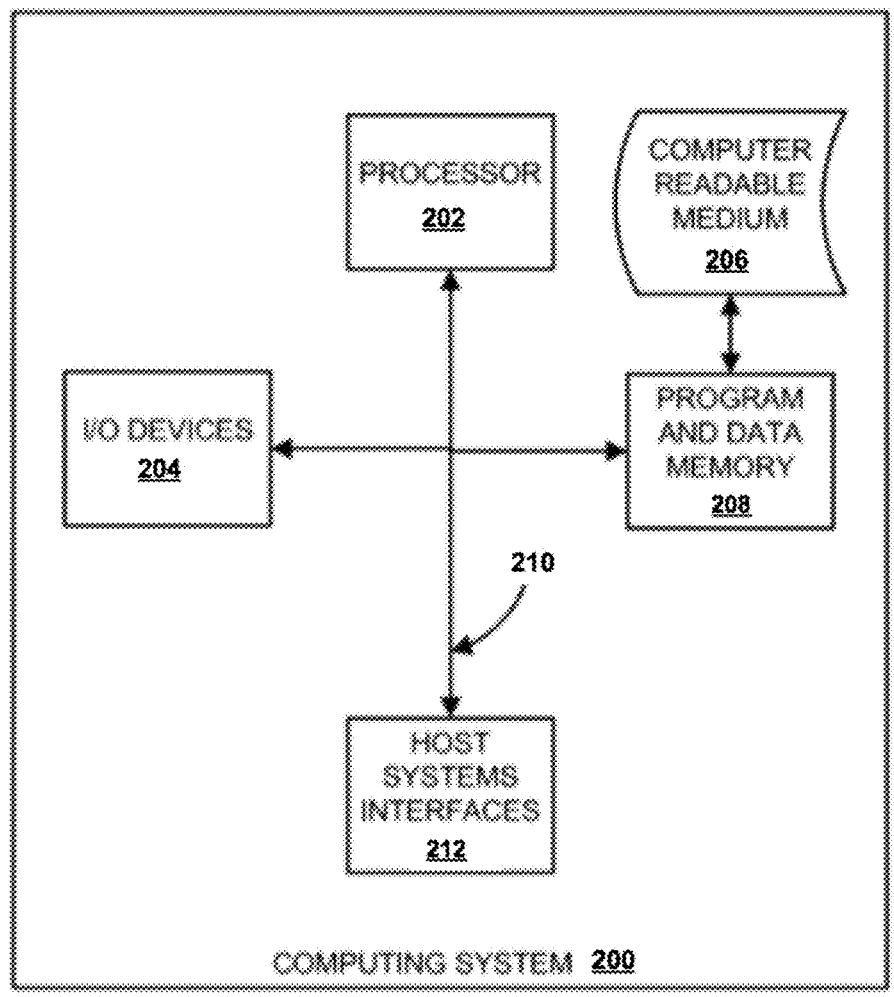
FIG. 2B is a block diagram of an exemplary computing system in which a computer readable medium provides instructions for performing methods described herein.

In an embodiment, the invention is implemented in software, which includes but is not limited to firmware, resident software, microcode, etc. FIG. 2B illustrates a computing system 200 in which a computer readable medium 206 may provide instructions for performing any of the methods disclosed herein.

Furthermore, the invention can take the form of a computer program product accessible from the computer readable medium 206 providing program code for use by or in connection with a computer or any instruction execution system. For the purposes of this description, the computer readable medium 206 can be any apparatus that can tangibly store the program for use by or in connection with the instruction execution system, apparatus, or device, including the computer system 200.

The medium 206 can be any tangible electronic, magnetic, optical, electromagnetic, infrared, or semiconductor system (or apparatus or device). Examples of a computer readable medium 206 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 200, suitable for storing and/or executing program code, can include one or more processors 202 coupled directly or indirectly to memory 208 through a system bus 210. The memory 208 can include local memory employed during actual execution of the program code, bulk storage, and cache memories which provide temporary storage of at least some program code in order to reduce the number of times code is retrieved from bulk storage during execution. Input/output (I/O) devices 204 (including but not limited to keyboards, displays, pointing devices, etc.) can be coupled to the system either directly or through intervening I/O controllers. Network adapters may also be coupled to the system to enable the computing system 200 to become coupled to other data processing systems, such as through host systems interfaces 212, or remote printers or storage devices through intervening private or public networks. Modems, cable modem and Ethernet cards are just a few of the currently available types of network adapters.

The systems, methods and software disclosed herein are further illustrated by the following Example. This Example is for illustrative purposes only and is not intended to limit the disclosure.

EXAMPLE

This Example discloses a method for optimally sending large amounts of bursty data through a modem by exploiting the heavy tailed properties of inter-burst statistics.

The data for this Example were taken from the Mediacom data in spring of 2018 consisting of about 31 days worth of data. The data included both client and server data for a particular modem. This modem was chosen for having fairly high rates of traffic, over $10^{11}$ total bytes during the period. Additionally, the data were binned in 1-second intervals.

Approach

Figure 3:
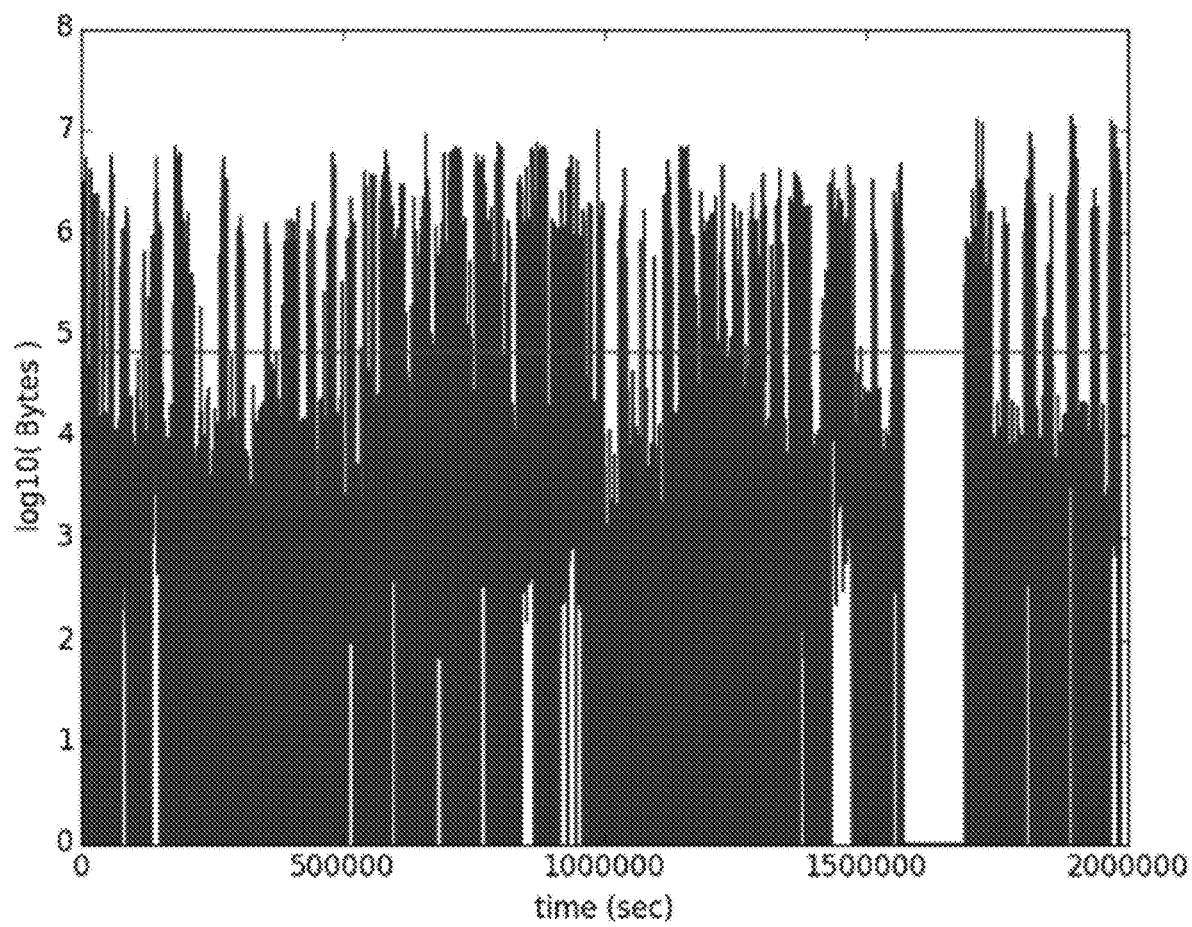
FIG. 3 is a schematic of log 10 traffic in 1 second intervals (sampled every 10 seconds), according to an embodiment.

A "burst" was defined as data above a certain percentile of the traffic rate (bytes) in a time bin (1 second). In the results reported here, the percentile was defined as the 90th percentile, although other high percentiles behave similarly. Thus, the time between bursts is the time between traffic peaks of this level. This can be seen in FIG. 3 for the particular device.

Analysis

Fitting and Parameterization

Figure 4:
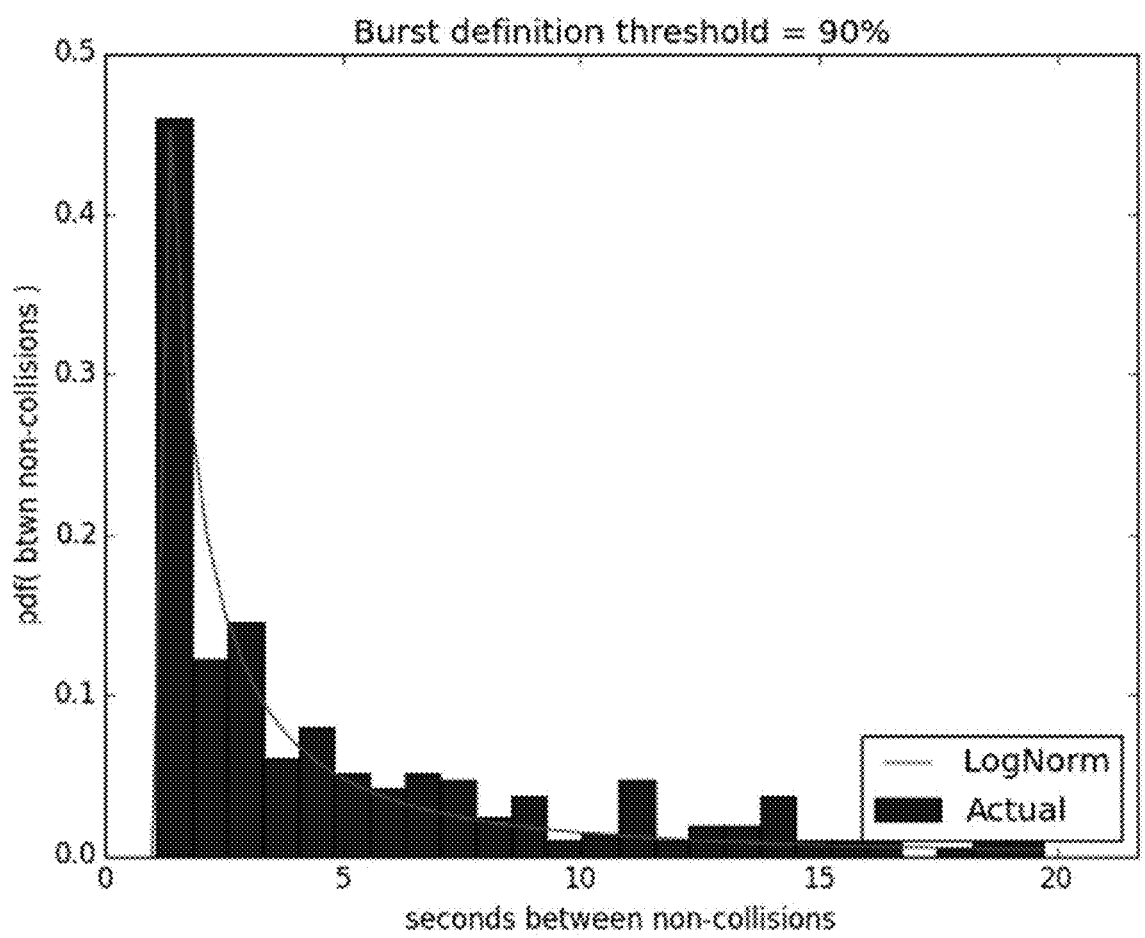
FIG. 4 is a probability distribution function of the time in units of 10 seconds between bursts with a lognormal fit line, according to an embodiment.

Due to the large scale of the bursts and the associated fitting, it was necessary to scale the data by a factor of 10 and then rescale after the analysis. The results obtained with the device tested are shown in FIG. 4. "Non-collisions" refers to the time between the bursts (defined as in the 90th percentile and above). The curve is the best lognormal fit to the data. Note that the minimum time between bursts was defined to be 10 seconds, meaning that any traffic above the threshold within 10 seconds was considered as part of the same burst. Also, consistent with this definition, the latest spike above the threshold resets the 10 second "end of burst" or inter-burst timer to 10 seconds again. Once there is a period of 10 seconds from the latest traffic above the threshold the time from the end of that burst to the next traffic above threshold is considered as the time between bursts (inter-burst gap). Thus, the minimum time between bursts was 11 seconds and a maximum inter-burst time was set at 200 seconds. There were a total of 269 bursts in the data, as defined this way.

Optimal Time to Send a Burst

Using the average versus the standard deviation of the distribution of intervals between bursts and exploiting the fact that for a log-normal distribution it is possible to obtain analytical solutions, one can use the basic approach described in S. M. Maurer and B. A. Huberman, "Restart strategies and Internet congestion," Journal of Economic Dynamics and Control, Volume 25, Issues 3-4, March 2001, Pages 641-654.

The curve is constructed using the moment-generating functions for the lognormal. The average time and mean squared average are given in terms of the moments of the distribution by:

$$\langle t \rangle = \frac{1}{M_0}[M_1 + \tau(1 - M_0)]$$

$$\langle t^2 \rangle = \frac{1}{M_0}\left[M_2 + \tau(1 - M_0)\left(2\frac{M_1}{M_0} + \tau\left(\frac{2}{M_0} - 1\right)\right)\right]$$

with the $n^{th}$ moment-generating function for the lognormal given by:

$$M_n(\tau) = \frac{1}{2}\exp\left(\frac{\sigma^2 n^2}{2} + \mu n\right)\left[1 + \mathrm{erf}\left(\frac{\log\tau - \mu}{\sigma\sqrt{2}} - \frac{\sigma n}{\sqrt{2}}\right)\right]$$

so that $$\mu = \langle t \rangle \text{ and } \sigma = \sqrt{\langle t^2 \rangle - \langle t \rangle^2}.$$

Figure 5:
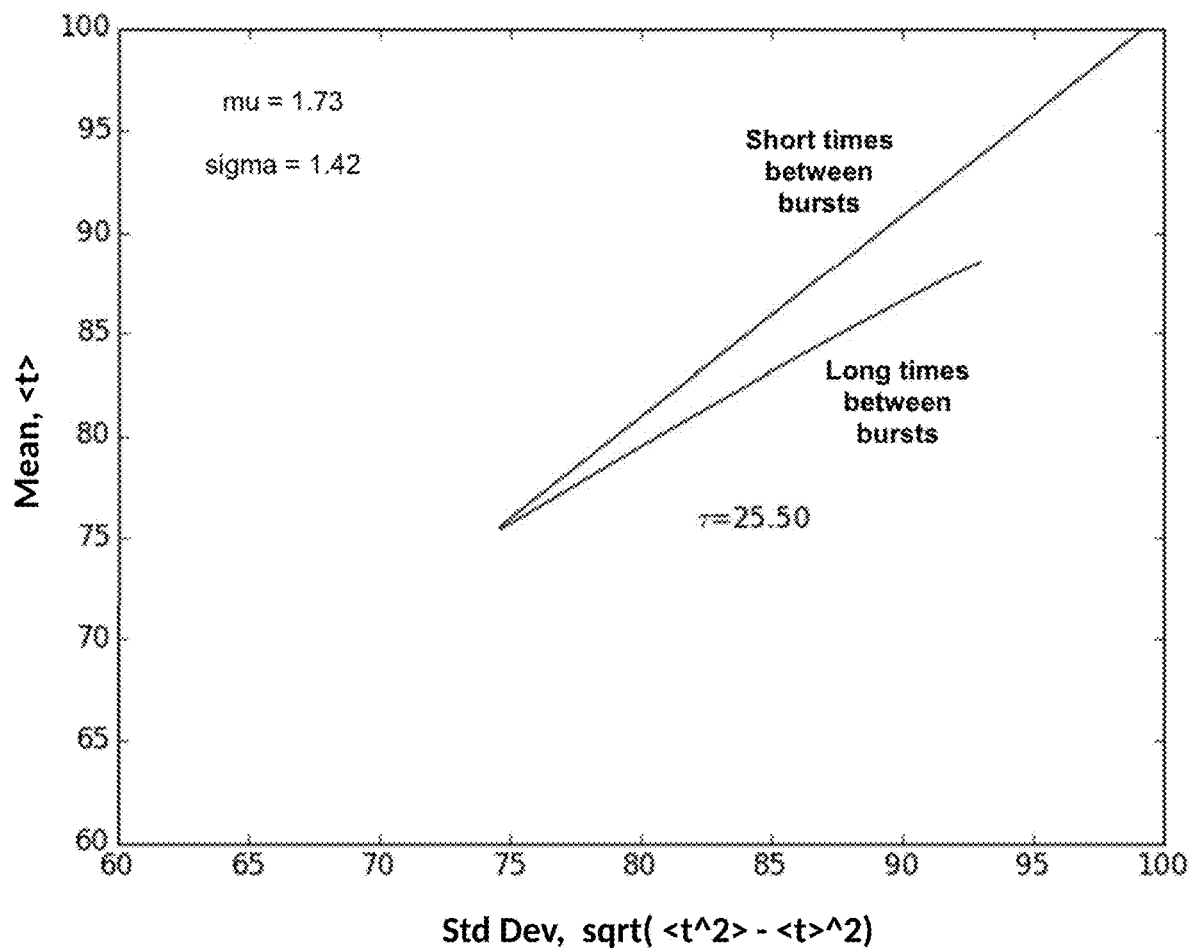
FIG. 5 is a graph of the mean and standard deviation for one modem showing the optimal time to send a large burst of data, according to an embodiment.

The resulting $\langle t \rangle$ versus $\sigma$ curve is shown in FIG. 5. The curve is a parametric depiction of the different values of "time to send a burst after the previous burst," or time between non-collisions with another burst. The optimal transmission time, resides at the cusp of the curve. The interpretation of this optimal transmit time is that it is the best time to transmit a large amount of data with minimum risk of a co-occurring burst. For the particular set of values described above, the minimum of the curve occurs at an average of 75 seconds. When this value is substituted for $M_n(\tau)$, the optimal transmit time $t=25.5$ seconds, which corresponds to the $43^{rd}$ percentile of the size of bursts (defined as being between 10 seconds and 200 seconds). That means 43% of the bursts will transmit before $\tau$, and 43% of the data points in FIG. 4 fall below the corresponding log 10 value of 2.55.

Operationally, $\tau$ gives the time that one should wait until transmitting a big burst. The wait time allows for other traffic (e.g., the 43% of bursts mentioned above) to transmit and clear before time $\tau$, while waiting longer increases the likelihood of colliding with a big traffic transmission from another user. Smaller magnitudes of traffic can be transmitted at once.

As the magnitude of a burst threshold is increased, the value of $\tau$ will also increase. For example, at a threshold corresponding to the $92^{nd}$ percentile, $\tau=48.2$ seconds. This is to be expected, as the larger threshold means there are fewer bursts so that they will necessarily be farther apart. The relationship between the threshold and t is also expected to be non-linear because of the heavy tail in the inter-burst gap distribution.

This Example focused on "bursty traffic" to distinguish it from a transmission that is too small to cause capacity problems. For example, the data in this Example used the 90% largest amount of data to define "bursty traffic", meaning that most of the traffic was less than that amount by orders of magnitude.

While it may be possible to dispense with the contention window (CW) using this scheme, it may also be possible to incorporate the optimal burst transmission time into a CW scheme. For example, the size of the CW can be set fixed to t and the rest of the algorithm proceeds as before. $\tau$ should be updated periodically to take into account the non-stationary nature of the traffic.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method for determining an optimal burst transmission time through a modem comprising:
    monitoring a traffic rate through a modem over a period;
    identifying a burst in the traffic rate when the traffic rate exceeds a threshold;
    measuring inter-burst gaps, where the gaps are defined by a minimum time passage and a maximum time passage;
    determining a mean and a standard deviation of a lognormal distribution of the inter-burst gaps;
    using the mean and the standard deviation of the lognormal distribution in a moment-generating function to identify an average time passage value when a risk of a co-occurring burst is minimized;
    inserting the average time passage value as a mean in the moment-generating function to back-calculate an optimal transmission time for a queued burst of traffic; and
    instructing the modem to transmit the queued burst of traffic at the optimal transmission time.

2. The method of claim 1 further comprising periodically updating the optimal transmission time by repeating the steps of monitoring, identifying, measuring, determining, using, inserting and instructing.

3. The method of claim 1 further comprising scaling the traffic rate.

4. The method of claim 1, wherein the optimal transmission time is based on a continuous timer or wherein the optimal transmission time is a count within a contention window.

5. The method of claim 1, wherein the modem is a single modem, a wireless access point, a node in a cable network, or a satellite communication link.

6. The method of claim 5, wherein the modem operably communicates with a single user or multiple users.

7. The method of claim 1, wherein the queued burst of traffic is uplink traffic, downlink traffic, or both uplink traffic and downlink traffic.

8. A non-transitory computer-readable medium having a plurality of non-transitory instructions executable with a processor for determining an optimal transmission time through a modem, the plurality of non-transitory instructions being executable for:
    monitoring a traffic rate through a modem over a period;
    identifying a burst in the traffic rate when the traffic rate exceeds a threshold; measuring inter-burst gaps, where the gaps are defined by a minimum time passage and a maximum time passage;
    determining a mean and a standard deviation of a lognormal distribution of the inter-burst gaps;
    using the mean and the standard deviation of the lognormal distribution in a moment-generating function to identify an average time passage value when a risk of a co-occurring burst is minimized;
    inserting the average time passage value as a mean in the moment-generating function to back-calculate an optimal transmission time for a queued burst of traffic; and
    instructing the modem to transmit the queued burst of traffic at the optimal transmission time.

9. The non-transitory computer-readable medium of claim 8 further comprising the plurality of non-transitory instructions being executable for periodically updating the optimal transmission time by repeating the steps of monitoring, identifying, measuring, determining, using, inserting and instructing.

10. The non-transitory computer-readable medium of claim 8, wherein the optimal transmission time is based on a continuous timer or wherein the optimal transmission time is a count within a contention window.

11. The non-transitory computer-readable medium of claim 8, wherein the modem is a single modem, a wireless access point, a node in a cable network, or a satellite communication link.

12. The non-transitory computer-readable medium of claim 11, wherein the modem operably communicates with a single user or multiple users.

13. The non-transitory computer-readable medium of claim 8, wherein the queued burst of traffic is uplink traffic, downlink traffic, or both uplink traffic and downlink traffic.

14. A system for determining an optimal transmission time through a modem, comprising: a cable modem termination system (CMTS) operably communicating with a modem; and a processor configured to monitor traffic rate through a modem over a period,
    to identify a burst in the traffic rate when the traffic rate exceeds a threshold, to measure inter-burst gaps, where the gaps are defined by a minimum time passage and a maximum time passage,
    to determine a mean and a standard deviation of a lognormal distribution of the inter-burst gaps,
    to use the mean and the standard deviation of the lognormal distribution in a moment-generating function to identify an average time passage value when a risk of a co-occurring burst is minimized;
    to insert the average time passage value as a mean in the moment-generating function to back-calculate an optimal transmission time for a queued burst of traffic, and
    to instruct the modem to transmit the queued burst of traffic at the optimal transmission time.

15. The system of claim 14, wherein the processor is disposed within the cable modem termination system or externally to the cable modem termination system.

16. The system of claim 14, wherein the processor is further configured to periodically update the optimal transmission time by repeating the steps of monitoring, identifying, measuring, determining, using, inserting and instructing.

17. The system of claim 14, wherein the optimal transmission time is based on a continuous timer or wherein the optimal transmission time is a count within a contention window.

18. The system of claim 14, wherein the modem is a single modem, a wireless access point, a node in a cable network, or a satellite communication link.

19. The system of claim 18, wherein the modem operably communicates with a single user or multiple users.

20. The system of claim 14, wherein the queued burst of traffic is uplink traffic, downlink traffic, or both uplink traffic and downlink traffic.

* * * * *